United States Patent
Sasaki et al.

(10) Patent No.: US 7,903,542 B2
(45) Date of Patent: Mar. 8, 2011

(54) PATH CHANGEOVER METHOD AND DEVICE

(75) Inventors: Hiroyuki Sasaki, Kawasaki (JP); Masayuki Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 148 days.

(21) Appl. No.: 12/215,411

(22) Filed: Jun. 27, 2008

(65) Prior Publication Data
US 2009/0003351 A1 Jan. 1, 2009

(30) Foreign Application Priority Data
Jun. 28, 2007 (JP) ................. 2007-170460

(51) Int. Cl.
*G01R 31/08* (2006.01)
(52) U.S. Cl. .......... 370/217; 370/242; 370/216; 370/401
(58) Field of Classification Search ........................ None
See application file for complete search history.

(56) References Cited

U.S. PATENT DOCUMENTS

| | | | |
|---|---|---|---|
| 7,046,680 B1 * | 5/2006 | McDysan et al. ............. | 370/396 |
| 2003/0035368 A1 * | 2/2003 | Tanada .......................... | 370/216 |
| 2003/0208618 A1 * | 11/2003 | Mor et al. ..................... | 709/238 |
| 2006/0013210 A1 * | 1/2006 | Bordogna et al. ............ | 370/389 |

FOREIGN PATENT DOCUMENTS
JP 2004-64574 2/2004
* cited by examiner

*Primary Examiner* — Duc C Ho
(74) *Attorney, Agent, or Firm* — Staas & Halsey LLP

(57) ABSTRACT

Path changeover method and device are provide in which a communication interruption time caused by occurrence of a transmission failure is shortened. On a frame receiving side, address information of a frame received from a first physical port is stored in a table in association with the first physical port. When detecting that a frame stored with the same address information as the address information stored in the table is received at a second physical port, the frame received at the second physical port is captured and following frames received at the first physical port are discarded.

25 Claims, 16 Drawing Sheets

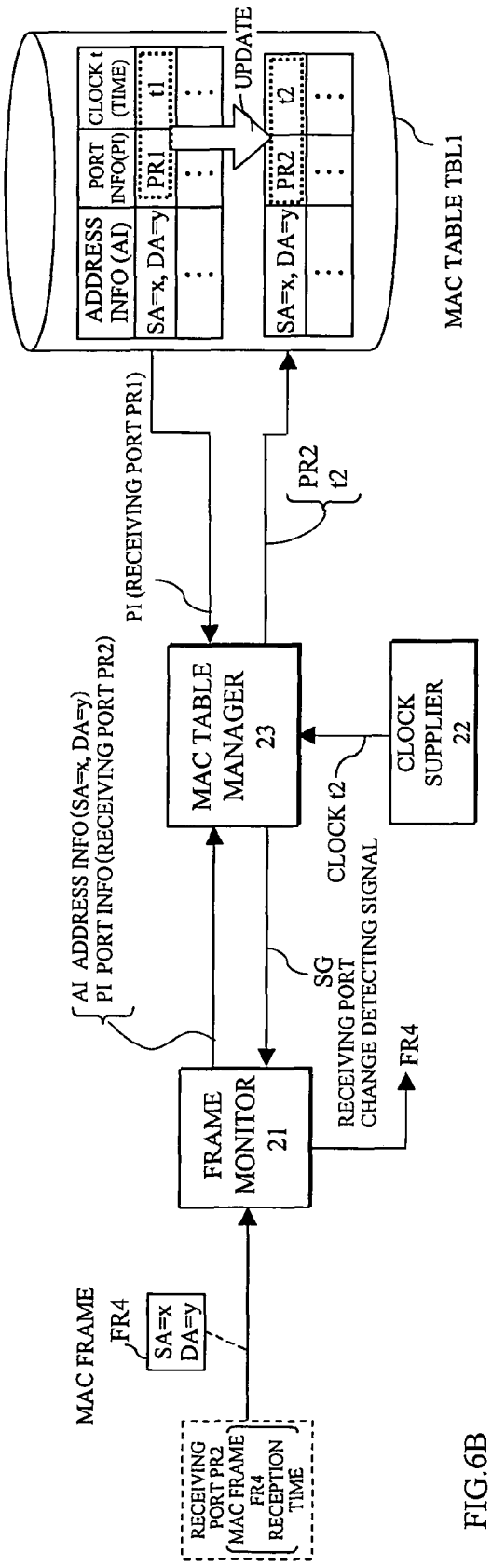
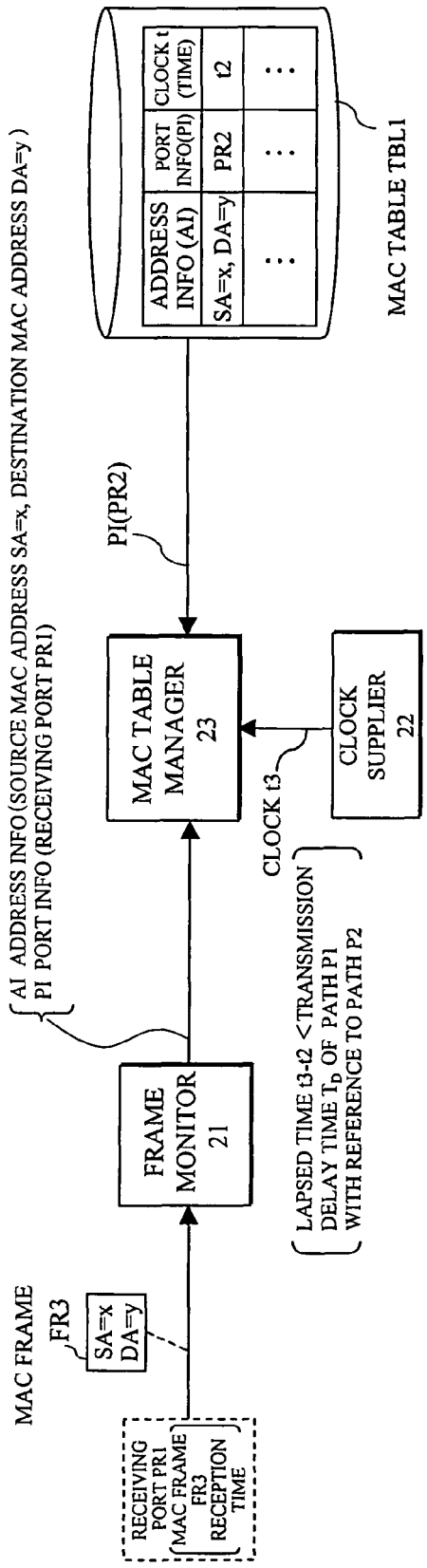
FIG.6A
FIG.6B

RECEPTION SIDE SWITCHING DEVICE 2

PATH CHANGEOVER METHOD AND DEVICE

CROSS-REFERENCE TO RELATED APPLICATIONS

This application is related to and claims priority to Japanese Patent Application No. 2007-170460, filed on Jun. 28, 2007, in the Japan Patent Office, and incorporated by reference.

BACKGROUND OF THE INVENTION

1. Field of the Invention

The present invention relates to a path changeover method and device, and in particular to a path or route changeover method and device used in an L2 network or the like applied with a link aggregation technology.

2. Description of the Related Art

FIG. 14 shows a configuration of an L2 network applied with a link aggregation technology generally known in the art. In this L2 network NW, between a transmission side switching device 1 and a reception side switching device 2 for a MAC frame FR a link aggregation LA logically integrating e.g. two physical paths P1 and P2 is provided, where relay devices 3_1 and 3_2 are provided in the path P1 as shown, and path lengths PL1 and PL2 of the paths P1 and P2 are mutually different (PL1>PL2 in the example shown).

The transmission side switching device 1 includes a transmission processor 10 for transmitting the MAC frame FR received from a client terminal (not shown) or the like at the former stage thereof to the path P1 or P2 through a transmitting port PT1 or PT2 respectively connected to the path P1 or P2.

The reception side switching device 2 includes a reception processor 20 for transmitting the MAC frame FR received from a receiving port PR1 or PR2 respectively connected to the path P1 or P2 to a client terminal (not shown) or the like at the latter stage thereof in the reception order.

In a normal operation where no transmission failure occurs in either the path P1 or P2, as shown in FIG. 15A a frame sender 11 included in the transmission processor 10 receives a MAC frame FR1 shown in FIG. 14.

At this time, the frame sender 11 extracts as address information AI a source MAC address SA="x" and a destination MAC address DA ="y" stored in the MAC frame FR1 and gives them to a hash controller 12 together with trunk information (abbreviated as info in the Figures) TI="trunk TR1" predetermined corresponding to a link aggregation LA (namely, the reception side switching device 2 forming a transfer destination of the MAC frame) shown in FIG. 14.

The hash controller 12 provides the trunk information TI to an LA table manager 13 to acquire port state information SI corresponding to the trunk TR1 from an LA table TBL3. The LA table manager 13 provides the port state information SI acquired to the hash controller 12.

It is to be noted that the above port state information SI indicates, as shown in the LA table TBL3, whether or not the transmitting port PT1 or PT2 is in an available state, where in the available state "IS: in service" is set while in the unavailable state "OOS: out of service" is set.

The hash controller 12 having received the port state information SI performs a predetermined hashing operation to the source MAC address SA="x" and the destination MAC address DA="y" in the address information AI and determines a transmitting port as a destination of the MAC frame FR1 based on the hashing operation result. If the destination of the MAC frame FR1 is determined to be the transmitting port PT1, the hash controller 12 provides a transmitting port notification NT indicating the transmitting port="PT1" to the frame sender 11 since the transmitting port PT1 is now available ("IS: in service").

It is to be noted that the MAC frame FR includes, as shown in FIG. 16, a VLAN tag TG and data DT or the like in addition to the above noted source MAC address SA and destination MAC address DA, so that the hash controller 12 can determine the destination of the MAC frame FR by performing a hashing operation to the VLAN tag TG or by performing a hashing operation only to one of the source MAC address SA and destination MAC address DA.

The frame sender 11 having been notified with transmitting port="PT1" sends the MAC frame FR1 to the path P1 through the transmitting port PT1.

This enables the MAC frame FR1 to be received at a receiving port PR1 in the reception side switching device 2 after having passed through the relay devices 3_1 and 3_2 shown in FIG. 14, and transferred by a reception processor 20 to the latter stage.

Hereafter, unless a transmission failure occurs in the path P1, the transmission processor 10 transmits following MAC frames in which the source MAC address SA="x" and the destination MAC address DA="y" are stored, through the transmitting port PT1. Namely, a MAC frame having stored therein the same address information is to be transferred through the same path.

On the other hand, in a transmission failure FL occurring in the path P1, e.g. between the transmitting port PT1 and the relay device 3_1 as shown in FIG. 14, a transmission failure detector 14 forming the transmission processor 10 detects the transmission failure of the transmitting port PT1, and its notification NF is provided to the LA table manager 13, as shown in FIG. 15B.

The LA table manager 13 sets (updates) the port state information relating to the transmitting port PT1 in the LA table TBL3 to "OOS: out of service".

When having received a MAC frame FR2 in which the source MAC address SA="x" and the destination MAC address DA="y" are stored, the frame sender 11 extracts, as shown in FIG. 15A, the source MAC address SA="x" and the destination MAC address DA="y" from the MAC frame FR2 as the address information AI, to be provided to the hash controller 12 together with the trunk information TI="trunk TR1".

Having acquired the port state information SI relating to the transmitting ports PT1 and PT2 from the MAC table TBL3 in the same manner as FIG. 15A, the hash controller 12 recognizes that the transmitting port PT1 which should be a destination of the MAC frame FR2 is in the unavailable state ("OOS: out of service") and transmits a transmitting port notification NT indicating transmitting port="PT2" instead of the transmitting port PT1 to the frame sender 11.

In response, the frame sender 11 judges that a transmission failure has occurred in the path P1 because the transmitting port which should be the destination is changed from PT1 to PT2 although the MAC frame FR2 in which the same source MAC address SA and destination MAC address DA as the MAC frame FR1 are stored has been received, so that the frame sender 11 transmits the MAC frame FR2 through the transmitting port PT2 to the path P2 after a predetermined changeover waiting time TW has lapsed.

It is to be noted that in the above noted changeover waiting time TW, a time sufficiently longer than a transmission delay time of the path P1 in comparison with the path P2 is set so that the MAC frame FR2 transmitted to the path P2 and MAC frames left in the path P1 may be maintained in the receiving order in the reception side switching device 2 (namely, the MAC frame FR2 may not arrive ahead of the MAC frames left in the path P1).

This makes the MAC frame FR2 received at the receiving port PR2 in the reception side switching device 2 in the normal order later than the MAC frames left in the path P1 and provided as an output by the reception processor 20 to the latter stage.

Thus, it is made possible for the transmission side switching device 1 and the reception side switching device 2 to guarantee the transfer order of the MAC frame between client terminals.

As a reference, there has been proposed a communication device for transferring MAC frames on an OC (Optical Carrier) line in an encapsulated shape (for example, see patent document 1).

Patent Document 1

Japanese patent application laid-open No. 2004-64574.

The above described prior art has a problem that since it changes over the destination port of a frame after a changeover waiting time has lapsed from an occurrence time of a transmission failure on the frame transmission side, the reception side has a blank time upon receiving the frame, causing a communication interruption (disconnection) over the network.

SUMMARY OF THE INVENTION

It is accordingly an object of the present invention to provide a path changeover method and device in which a communication interruption time caused by occurrence of a transmission failure is shortened.

[1] In order to achieve the above-mentioned object, a path changeover method (or device) according to one aspect of an embodiment comprises: a first step of (or first portion) storing address information of a frame received at a first physical port in association with the first physical port; a second step of (or second portion) capturing a frame received at a second physical port when detecting that a frame stored with same address information as the address information stored at the first step is received at the second physical port, and discarding following frames received at the first physical port.

Namely, the frame reception side stores address information of a frame received in association with a receiving physical port and monitors a change of their relationship, whereby a destination port (path) changeover on the transmission side of a frame accompanied by an occurrence of a transmission failure can be autonomously detected.

Then, a frame detoured by the destination port changeover is captured while on the other hand remaining frames having been transmitted before the destination port changeover is discarded, thereby preventing order inversion of a frame received.

This enables the transmission side of a frame to changeover the destination port of a frame without waiting for such a changeover waiting time as in the above-mentioned prior art, thereby reducing a communication interruption time caused by the transmission failure occurrence.

[2] In the above [1], the first step (or first portion) may comprise a third step of (or third portion) preparing a table associating address information of frames received at physical ports with the physical ports, and the second step (or second portion) may comprise a fourth step of (or fourth portion) retrieving from the table a physical port associated with address information stored in a following frame received at the first physical port after having prepared the table and of detecting, when determining that the retrieved physical port is different from the first physical port having received the following frame, that the following frame stored with the same address information is received at the second physical port, and a fifth step of (or fifth portion) capturing the following frame received at the second physical port and discarding the following frame received at the first physical port.

Thus, for simply monitoring a change of the relationship between the address information and the physical port, a table associating the address information with the physical port having received the frame can be used.

[3] In the above [2], the fourth step (or fourth portion) may further comprise a sixth step of (or sixth portion) updating the table from the retrieved physical port to the second physical port when detecting that the following frame stored with the same address information is received at the second physical port.

Namely, upon detecting a changeover of the destination port on the transmission side of the frame, the physical port retrieved from the table is updated to a receiving physical port of the frame detoured in preparation for a recovery of the transmission failure.

This enables a change-back at the time when the transmission failure is recovered and the transmission side of the frame changes back the destination port of the frame, to be detected.

[4] In the above [3], the sixth step (or sixth portion) may further comprise a step of (or portion) recording the updating time of the table in association with the address information; the fourth step (or fourth portion) may further comprise a step of (or portion) detecting that a further frame stored with the same address information is received again at the first physical port, when determining that after having updated the table the retrieved physical port is different from the first physical port having received the further frame and a maximum transmission delay time between paths connected to the physical ports has lapsed from the updating time.

Namely, in order that a change-back of the destination port on the transmission side of the frame is not falsely detected due to the remaining frames, a change-back of the destination port is detected only in the case where the maximum transmission delay time (namely, a sufficient time for the remaining frames to be discarded) between paths connected to the physical ports has lapsed from the updating time of the table.

[5] In the above [2], the fourth step (or fourth portion) may further comprise a sixth step of (or sixth portion) deleting the physical port and the address information associated therewith from the table, when a predetermined time interval has lapsed from a latest time at which the frame is received at the physical port.

Namely, records of the number of the address information are to be prepared in the table, so that the information of a physical port having not received the frame for a predetermined time interval as well as the address information corresponding to the physical port are deleted, whereby an increase of the table size can be suppressed.

[6] In the above [2], the frame may be transmitted depending on a hashing operation result with respect to the address information at a source of the frame; the third step (or third portion) may comprise a step of (or portion) storing an operation result obtained by performing same hashing operation as the source to the address information in association with the physical port having received the frame; and the fourth step (or fourth portion) may further comprise a step of (or portion) retrieving from the table a physical port associated with an operation result obtained by performing the hashing operation to the address information stored in a following frame subsequently received at the first physical port after having stored the operation result.

Namely, in such a case where the transmission side of the frame determines the destination port in accordance with the result of a hashing operation performed to the address information as in the above prior art, the reception side of the frame stores the operation result obtained by performing the same hashing operation as the transmission side to the address information of the received frame in association with the receiving physical port and monitors a change of a relationship between the address information and the physical port with the hashing operation result being made a key.

In this case, it becomes possible to make the reception of the frame stored with the address information giving the same hashing operation result while the address information itself is different a detection trigger of the destination port changeover on the reception side, whereby a communication interruption time caused by an occurrence of a transmission failure is shortened because the reception of the frame stored with the same address information is not required to be made a detection trigger of the destination port changeover. Also, since records of only the number of hashing operation result have to be prepared in the table, the table size can be made smaller than the table prepared in the above [2].

[7] In the above [6], the fourth step (or fourth portion) may further comprise a sixth step of (or sixth portion) updating the table from the retrieved physical port to the second physical port when detecting that the following frame stored with the same address information is received at the second physical port.

[8] In the above [7], the sixth step (or sixth portion) may further comprise a step of (or portion) recording the updating time of the table in association with the operation result; the fourth step (or fourth portion) may further comprise a step of (or portion) detecting that a further frame stored with the same address information is received again at the first physical port, when determining that after having updated the table the retrieved physical port is different from the first physical port having received the further frame and a maximum transmission delay time between paths connected to the physical ports has lapsed from the updating time.

[9] In the above [6], the fourth step (or fourth portion) may further comprise a sixth step of (or sixth portion) deleting the physical port and the operation result associated therewith from the table, when a predetermined time interval has lapsed from a latest time at which the frame is received at the physical port.

[10] In the above [6], the third step (or third portion) may further comprise a step of (or portion) acquiring an equation or function of the hashing operation from a control frame from the source.

Namely, since the same hashing operation equation can be automatically shared between the transmission side and the reception side of the frame, a maintenance person is not required to do maintenance works such as individually setting the operation equation or the like.

[11] In the above [1], the path changeover device may further comprise a third step of (or third portion) detecting a reception failure arising at the physical ports and suspending a frame reception at a physical port in which a reception failure is detected.

Namely, by compulsorily suspending the frame reception from a physical port where a reception failure has occurred, a detection of the transmission failure occurrence is promoted to the transmission side of the frame.

This enables the destination port changeover to be made on the transmission side of the frame, so that the detoured frame can be normally received at a physical port where no reception failure has occurred.

[12] In the above [1], in case that the frame is a MAC frame, at least one of a source MAC address and destination MAC address, or VLAN tag included in the MAC frame may be used for the address information.

Thus, a changeover waiting time upon a destination port changeover such as in the above prior art is made unnecessary, and a communication interruption time caused by an occurrence of a transmission failure can be largely reduced, whereby a blank time arising in a frame transferred between client terminals can be minimized. This effect figures in a network demanding a real time ability such as voice communications.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 6A and 6B are block diagrams showing a receiving port change detection process of a reception processor used in an embodiment [1] of a path changeover method and device;

DESCRIPTION OF THE EMBODIMENTS

Embodiments [1] and [2] of a path changeover method and device will now be described referring to FIGS. 1-13.

Embodiment [1]: FIGS. 1-8

Figure 1:
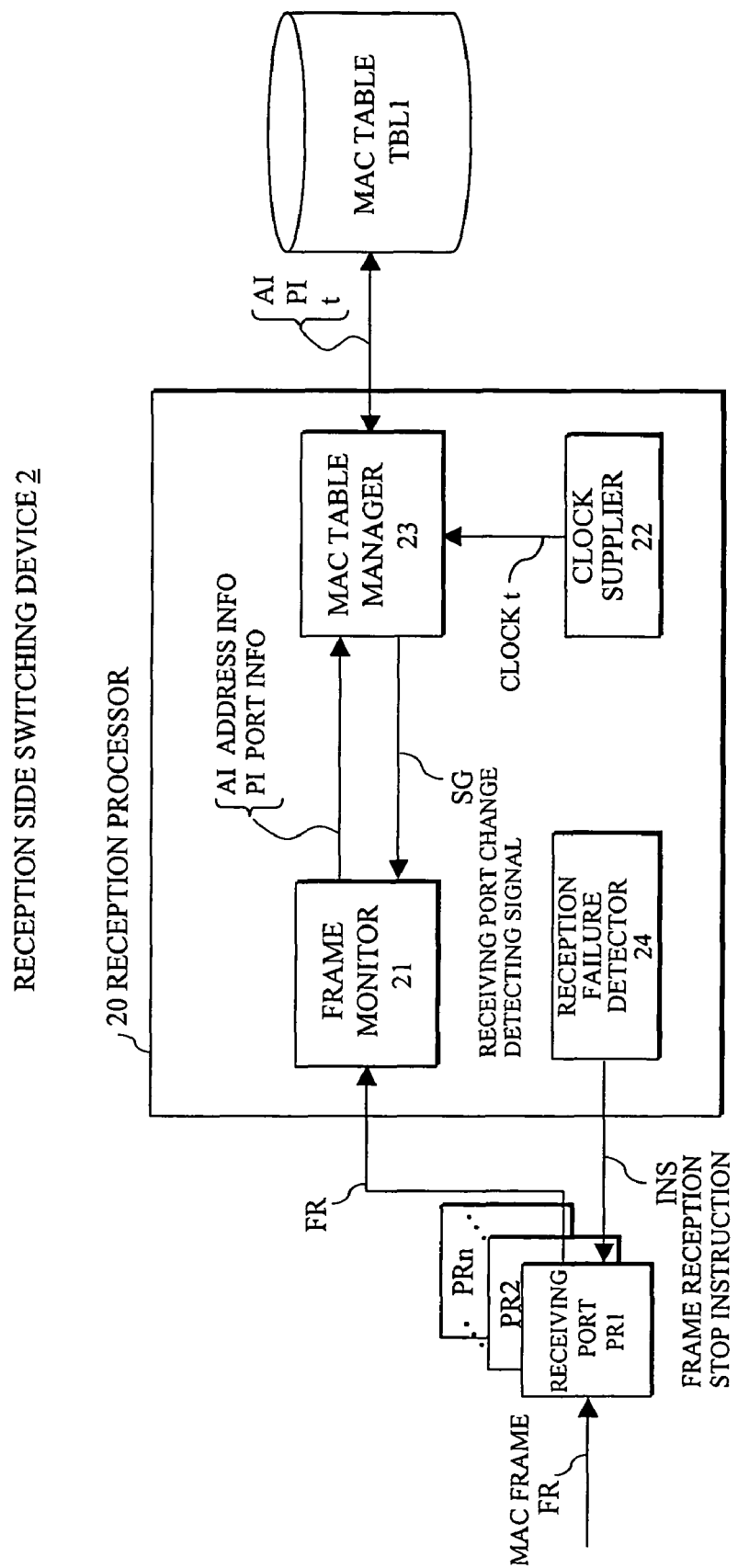
FIG. 1 is a block diagram showing an arrangement of an embodiment [1] of a path changeover method and device.

Arrangement: FIG. 1

A reception side switching device 2 (see FIG. 14) according to an embodiment [1] shown in FIG. 1 is schematically composed of a reception processor 20 which receives a MAC frame FR at "n" number of receiving ports PR1-PRn (hereinafter, occasionally represented by reference numeral PR), and a MAC table TBL1 updated and retrieved or referred to by the reception processor 20.

The reception processor 20 comprises a frame monitor 21 which extracts address information AI stored in the MAC frame FR received from the receiving port PR and outputs the address information AI together with information of receiving port (hereinafter, port information PI) having received the MAC frame FR, a clock supplier 22 which supplies clock (time) t, a MAC table manager 23 which registers (updates) the address information AI, the port information PI, and clock t in the MAC table TBL1 in association with each other and provides to the frame monitor 21 a receiving port change detection signal SG generated when a change of a receiving port of the MAC frame stored with the same address information is detected by referring to the MAC table TBL1, and a receiving a reception failure detector 24 provides a frame reception stop instruction INS generated when a reception failure arising at the receiving port PR is detected, to the receiving port.

Operation Example: FIGS. 2-8

Operations of this embodiment will now be described referring to FIGS. 2-8 in order of (1) operation example in the initial communication state, (2) operation example at a transmission failure occurrence, (3) operation example at a receiving port change detection, and (4) operation example at a transmission failure recovery.

Figure 2:
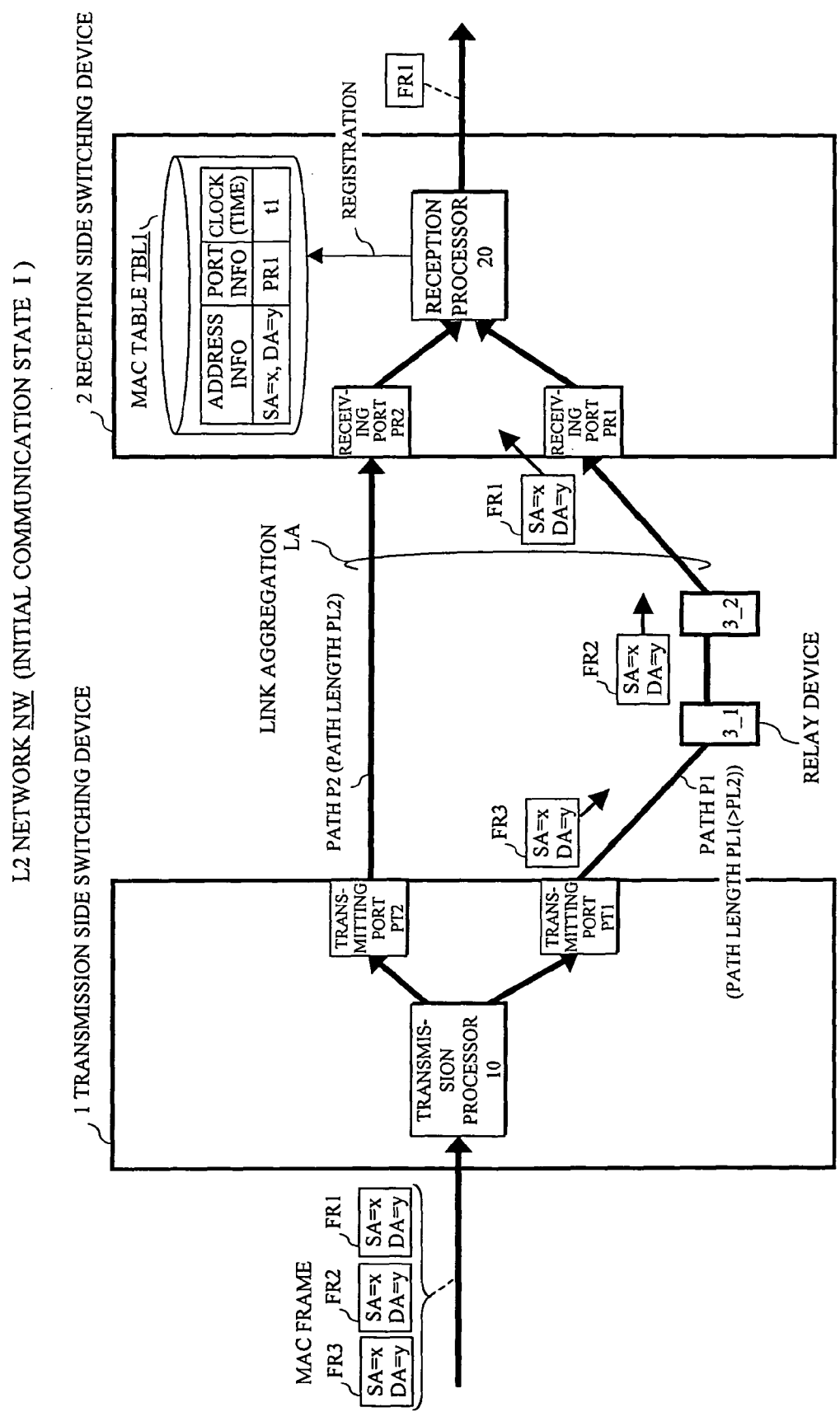
FIG. 2 is a block diagram showing an operation at an initial communication state of an embodiment [1] of a path changeover method and device.
Figure 3:
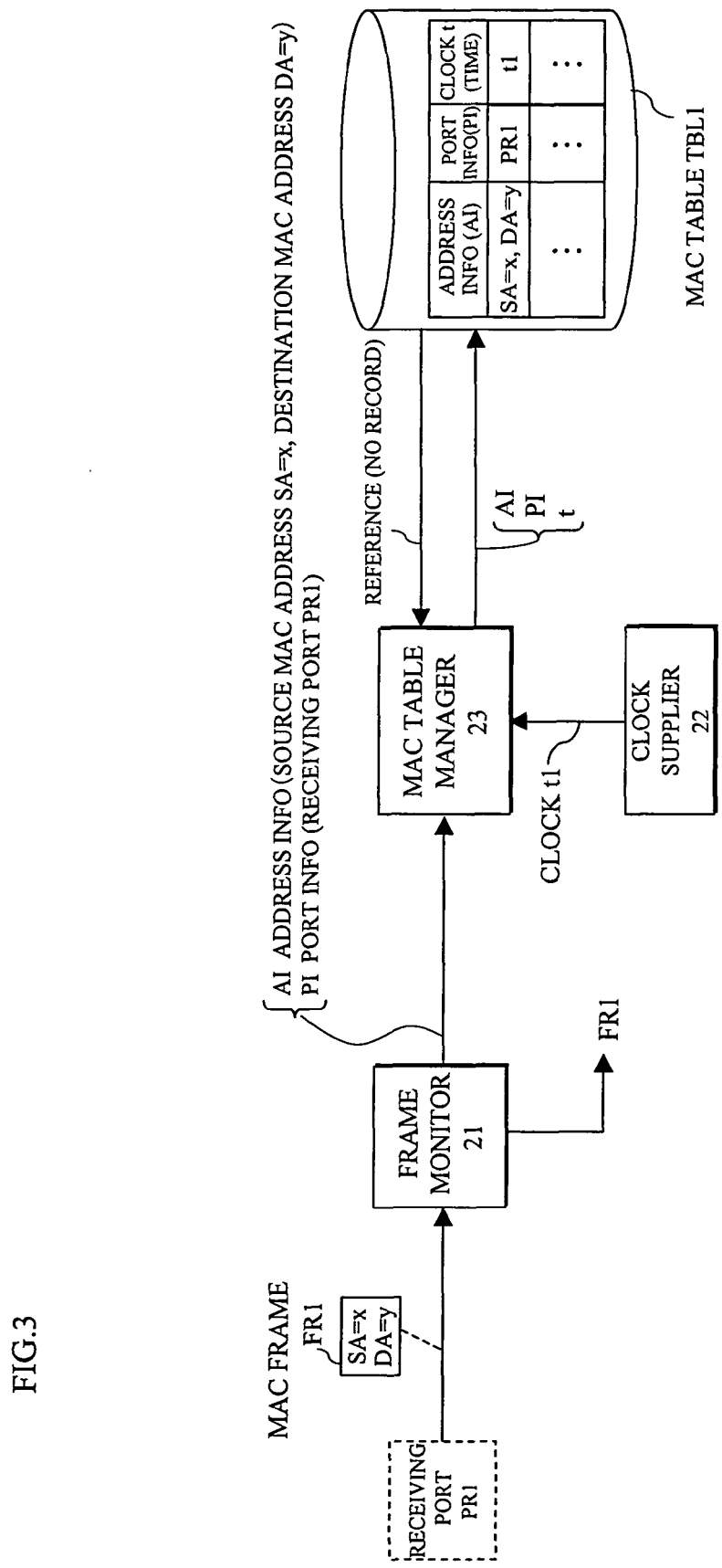
FIG. 3 is a block diagram showing a MAC table initial registration process of a reception processor used in an embodiment [1] of a path changeover method and device.

(1) Operation Example in Initial Communication State: FIGS. 2 and 3

Figure 14:
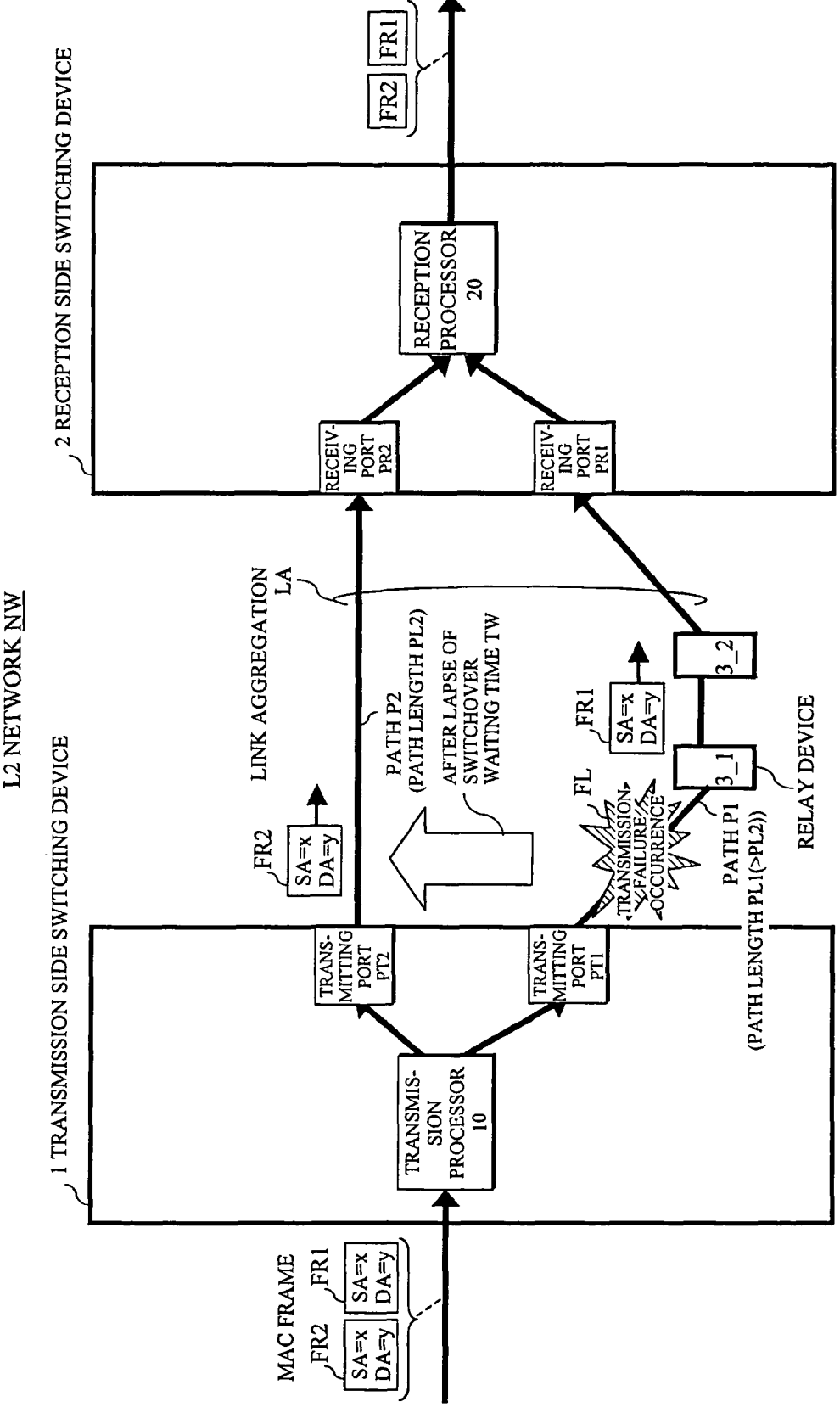
FIG. 14 is a block diagram showing a general configuration of an L2 network applied with a link aggregation.

Taking, for example, a case where two physical paths P1 and P2 form a link aggregation LA in the same manner as the L2 network NW shown in FIG. 14, as shown in FIG. 2 the transmission processor 10 in the transmission side switching device 1 sequentially receives MAC frames FR1-FR3 from a client terminal (not shown) or the like at the former stage.

Figure 15:
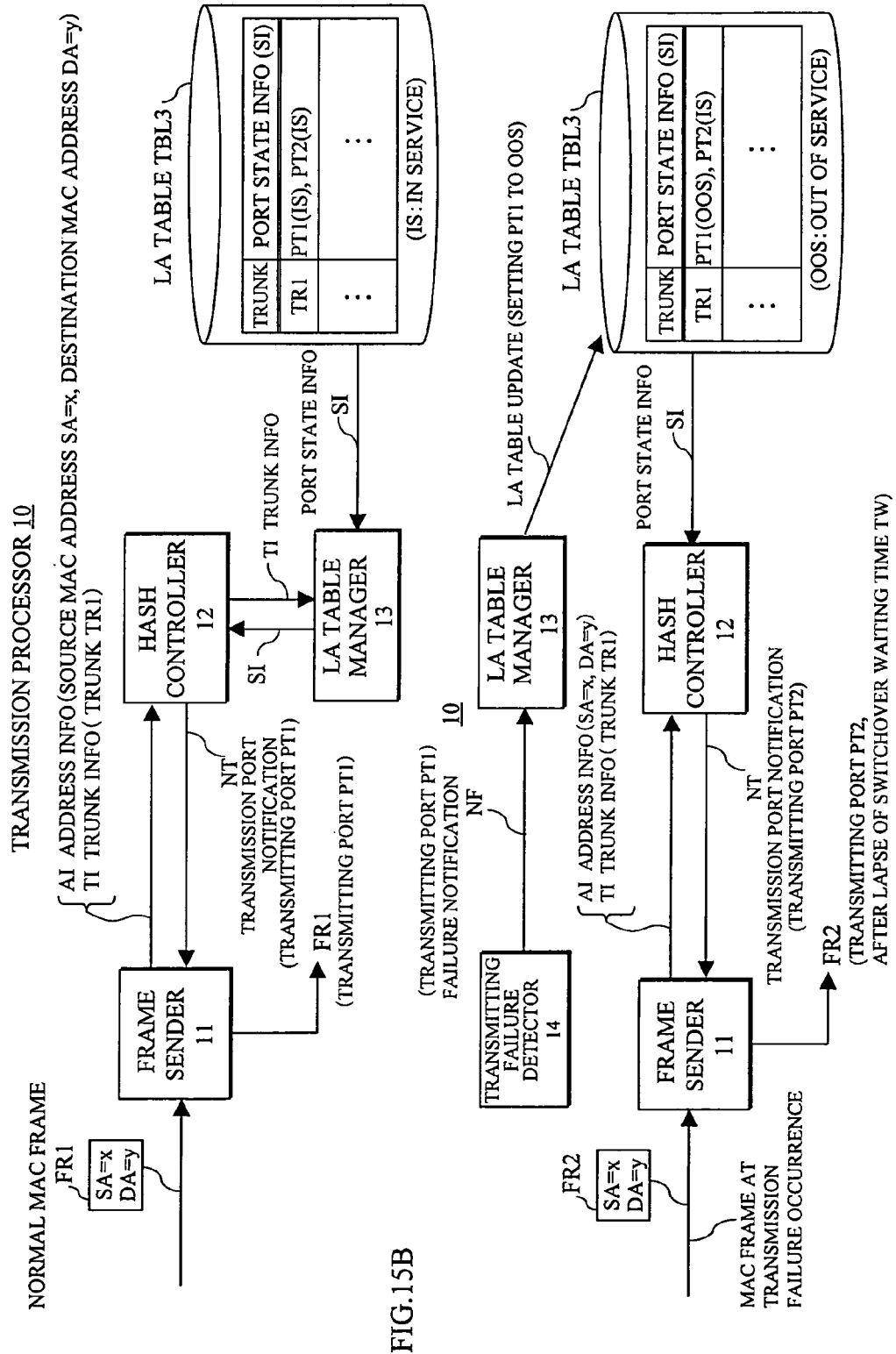
FIG. 15 is a block diagram showing an arrangement an operation of a conventional transmission processor.

If each of the MAC frames FR1-FR3 is stored with the same source MAC address SA="x" and destination MAC address DA="y", the transmission processor 10 transmits all of the MAC frames FR1-FR3 from the transmitting port PT1 like FIG. 15A.

The reception processor 20 in the reception side switching device 2 receives at first the MAC frame FR1 at the receiving port PR1. At this time, no record is registered in the MAC table TBL1, so that the reception processor 20 executes the initial registration process with respect to the MAC table TBL1.

Namely, as shown in FIG. 3, having received the MAC frame FR1 at the receiving port PR1, the frame monitor 21 extracts as address information AI the source MAC address SA="x" and the destination MAC address DA="y" stored in the MAC frame FR1 and gives them to the MAC table manager 23 together with port information PI set with the receiving port PR1 having received the MAC frame FR1.

The MAC table manager 23 refers to the MAC table TBL1 to check if there exists a record corresponding to the source MAC address SA="x" and the destination MAC address DA="y". Supposing that there exists no record corresponding to the source MAC address SA="x" and the destination MAC address DA="y", the MAC table manager 23 registers the address information AI and the port information PI in the MAC table TBL1 together with clock (time) t1 supplied by the clock supplier 22.

In this case, because of the receiving port change detecting signal SG shown in FIG. 1 being not provided by the MAC table manager 23, the frame monitor 21 transfers the MAC frame FR1 to the latter stage.

Figure 4:
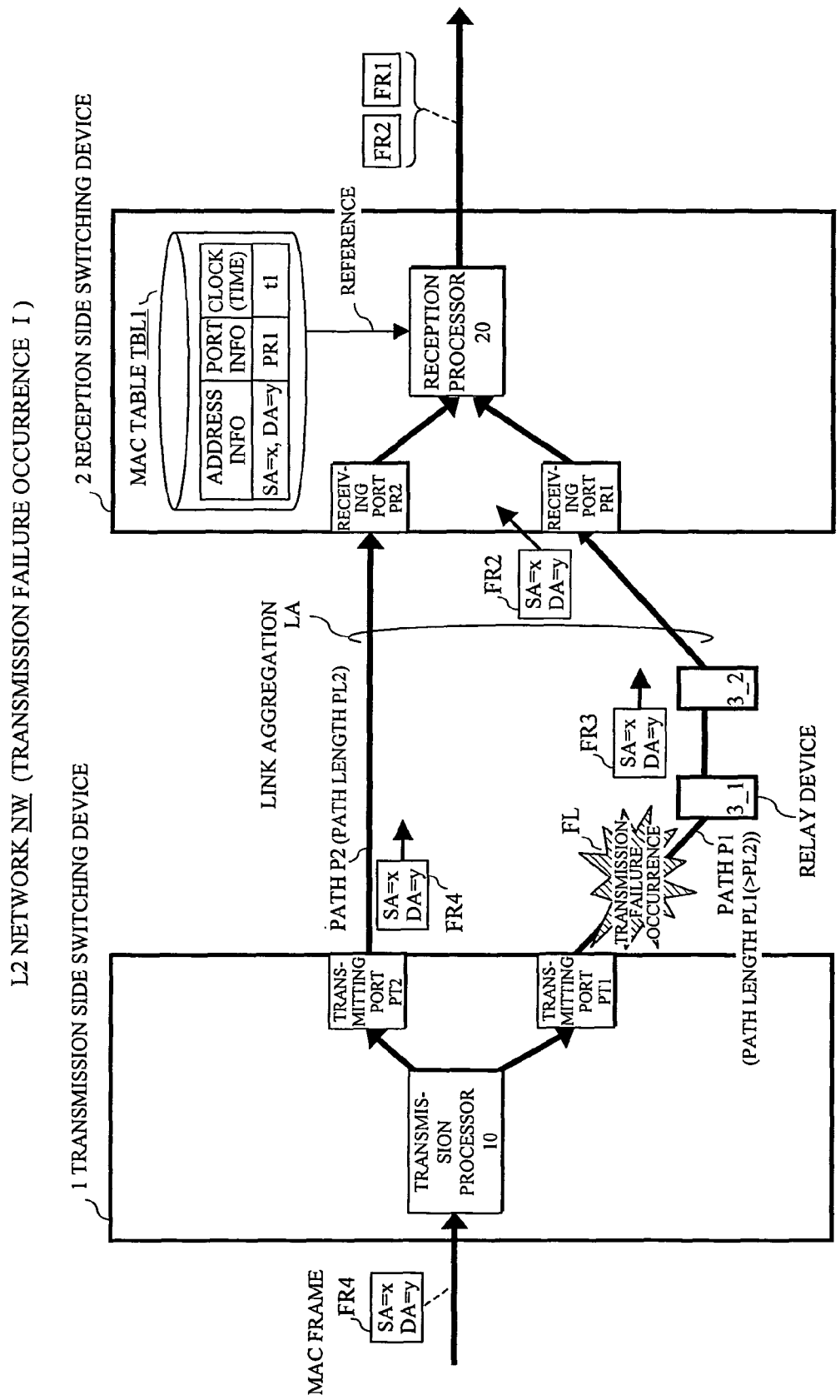
FIG. 4 is a block diagram showing an operation at a transmission failure occurrence of an embodiment [1] of a path changeover method and device.

(2) Operation Example at Transmission Failure Occurrence: FIG. 4

At the occurrence of a transmission failure FL as shown in FIG. 4 e.g. between the transmitting port PT1 and the relay device 3_1 after the transmission of the MAC frame FR3 shown in FIG. 2, the transmission processor 10 in the transmission side switching device 1 detects the occurrence of the transmission failure in the same manner as the prior art shown in FIG. 14.

At this time, the transmission processor 10 immediately sends out the MAC frame FR4 received subsequent to the MAC frame FR3 from the transmitting port PT2 without waiting for a changeover waiting time TW, which is different from the prior art.

Meanwhile, the reception side switching device 2 receives the MAC frame FR2 transmitted on the path P2 before the occurrence of the transmission failure at the receiving port PR1. At this time, the reception processor 20 refers to the port information (receiving port PR1) corresponding to the address information (source MAC address SA="x" and the destination MAC address DA="y") registered in the MAC table TBL1 by the above operation example (1). Since it is found that the receiving port PR1 having received the MAC frame FR2 is coincident with the port information retrieved from the MAC table TBL1, the reception processor 20 transfers the MAC frame FR2 to the latter stage.

Figure 5:
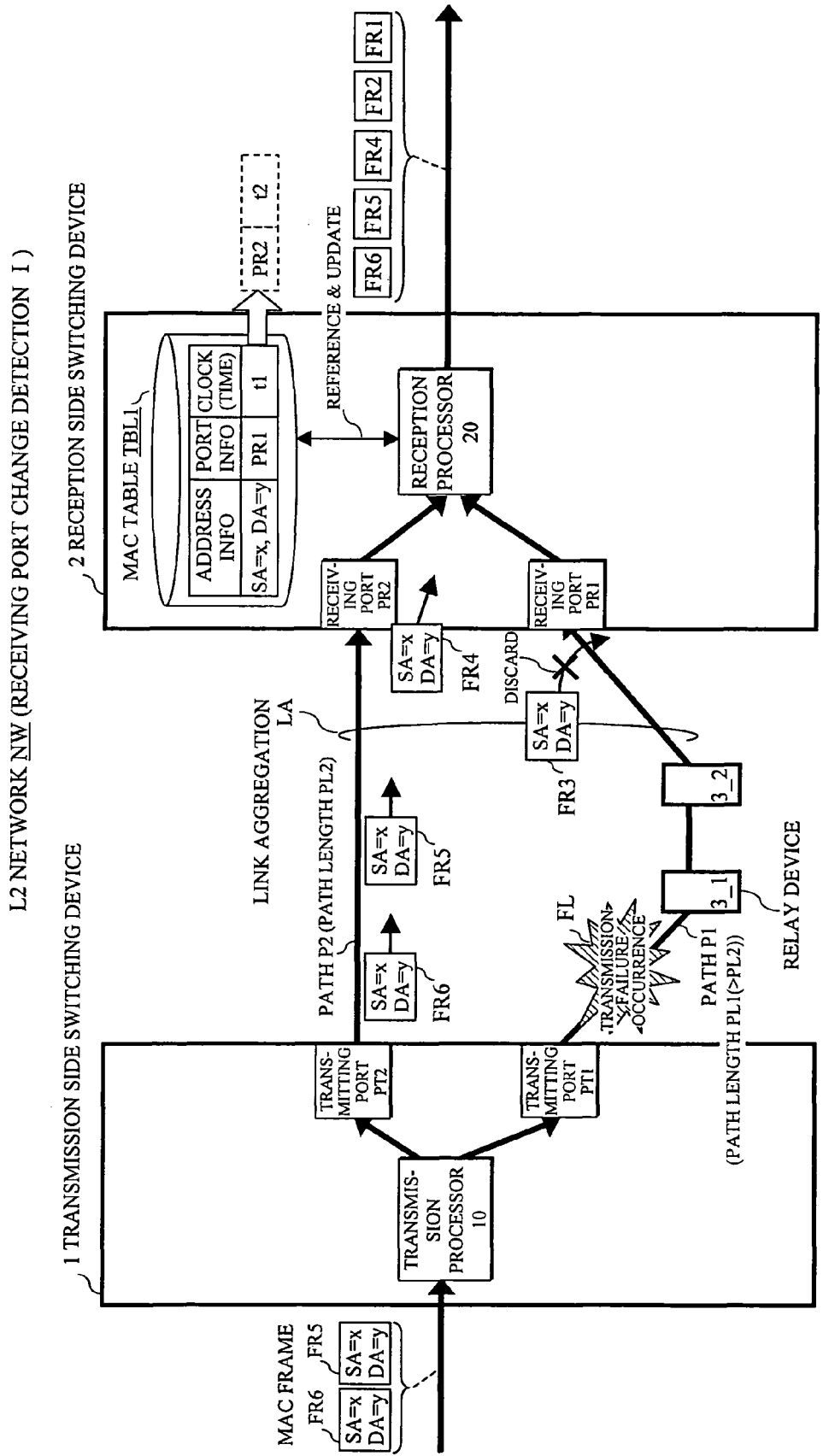
FIG. 5 is a block diagram showing an operation at the time of detecting a receiving port change of an embodiment [1] of a path changeover method and device.

(3) Operation Example at Receiving Port Change Detection: FIGS. 5 and 6

If the MAC frame FR4 arrives at the receiving port PR2 ahead of the MAC frame FR3 transmitted on the path P1 because the path length PL1 of the path P1 is longer than the path length PL2 of the path P2 as shown in FIG. 5, the reception processor 20 detects that the receiving port of the MAC frame stored with the same address information is changed from PR1 to PR2 by referring to the MAC table TBL1 with the source MAC address SA="x" and the destination MAC address DA="y" stored in the MAC address FR4 as the address information.

Namely, as shown in FIG. 6A, by a mutual operation between the frame monitor 21 and the MAC table manager 23, the MAC table manager 23 acquires from the MAC table TBL1 the port information PI="receiving port PR1" corresponding to the source MAC address SA="x" and the destination MAC address DA="y". Since the receiving port PR2 having received the MAC frame FR4 is different from the port information PI="receiving port PR1" acquired from the MAC table TBL1, the MAC table manager 23 detects a change of the receiving port and provides to the frame monitor 21 a receiving port change detecting signal SG.

Responsibly, the frame monitor 21 transfers the MAC frame FR4 to the latter stage.

Hereafter, the frame monitor 21 captures the MAC frame received from the receiving port PR2 and discards the MAC frame received from the receiving port PR1 until the receiving port change detecting signal SG is again received.

The MAC table manager 23 updates the port information PI corresponding to the source MAC address SA="x" and the destination MAC address DA="y" and clock t1 in the MAC table TBL1 respectively to the receiving port PR2 and clock t2 outputted from the clock supplier 22.

On the other hand, when the MAC frame FR3 is received at the receiving port PR1 subsequent to the MAC frame FR4, by a mutual operation between the frame monitor 21 and the MAC table manager 23 the MAC table manager 23 acquires from the MAC table TBL1 the port information PI="receiving port PR2" corresponding to the source MAC address SA="x" and the destination MAC address DA="y".

At this time, although the receiving port PR1 having received the MAC frame FR3 is different from the port information PI="receiving port PR2" acquired from the MAC table TBL1, the MAC table manager 23 refers to clock t3 outputted from the clock supplier 22, which is different from the case in FIG. 6A, and determines whether or not a lapse of time (t3−t2) from the updating time t2 of the MAC table TBL1 shown in FIG. 6A has exceeded a transmission delay time value $T_D$ of the path P1 in relation to the path P2.

Now supposing that the lapse of time (t3−t2) does not exceed the transmission delay time value $T_D$, the MAC table manager 23 recognizes that the MAC frame FR3 is a frame left or remaining in the path P1 at the time of the transmission failure occurrence, and does not generate the receiving port change detecting signal SG. Therefore, the frame monitor 21 discards the MAC frame FR3 and does not transfer it to the latter stage.

On the other hand, supposing that the lapse of time (t3−t2) exceeds the transmission delay time value $T_D$, the MAC table manager 23 judges that the MAC frame FR3 is not a remaining frame (namely, the transmitting port has been changed back by the transmission side switching device 1). In this case, an operation at the time of transmission failure recovery described in the undermentioned operation example (4) is to be performed.

It is to be noted that upon arranging the link aggregation LA with three physical paths or more, a transmission delay time (namely, the maximum transmission delay time which may arise between the paths) of the longest (or maximum transmission time) path with respect to the shortest (or minimum transmission time) path may be set for the above transmission delay time value $T_D$.

After this, when MAC frames FR5 and FR6 stored with the source MAC address SA="x" and the destination MAC address DA="y" shown in FIG. 5 are received at the receiving port PR2, the reception processor 20 transfers the MAC frame FR5 and FR6 to the latter stage.

Thus, only the MAC frame FR3 left in the path P1 by the transmitting port changeover in the reception side switching device 1 is to be discarded, whereby MAC frames transmitted to the latter stage of the reception side switching device 2 are subject to no receiving order inversion as shown.

Figure 7:
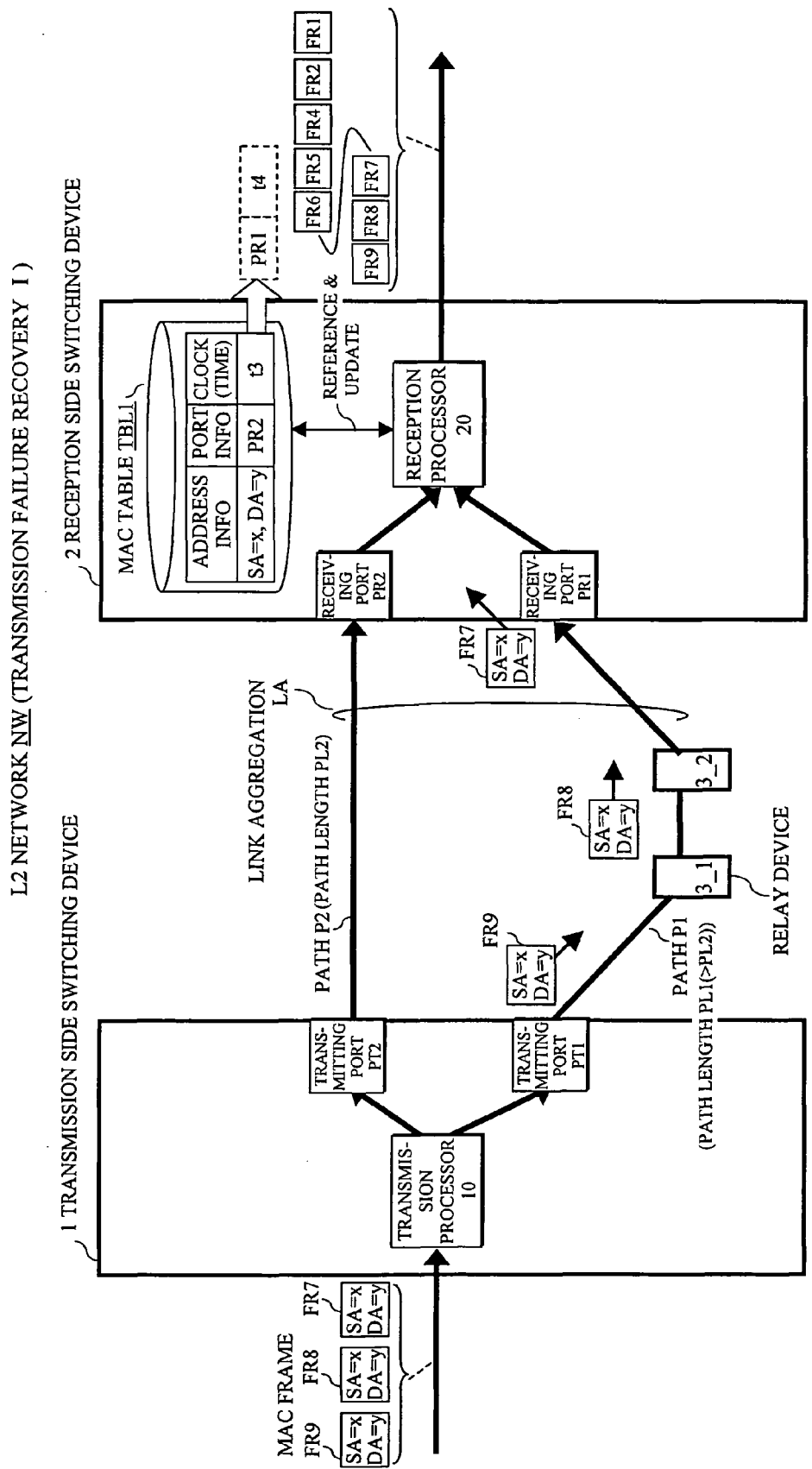
FIG. 7 is a block diagram showing an operation at a transmission failure recovery of an embodiment [1] of a path changeover method and device.

(4) Operation Example at Transmission Failure Recovery: FIG. 7

When the transmission failure FL having occurred between the transmission port PT1 and the relay device 3_1 is recovered as shown in FIG. 7, the transmission processor 10 in the transmission side switching device 1 transmits further MAC frames FR7-FR9 stored with the source MAC address SA="x" and the destination MAC address DA="y" from the transmitting port PT1 as with the case prior to the transmission failure occurrence.

When having received the MAC frame FR7 at the receiving port PR1 where it is supposed that the transmission delay time value $T_D$ has already lapsed from the updating time t2 of the MAC table TBL1 described in the above operation example (3), the reception processor 20 refers to the MAC table TBL1 as with the above operation example (3), thereby detecting that the MAC frame FR7 stored with the source MAC address SA="x" and the destination MAC address DA="y" is received from the receiving port PR1, not the receiving port PR2 (namely, a change-back of the transmission port has been made by the transmission side switching device 1), and transferring the MAC frame FR7 to the latter stage. Also, the reception processor 20 updates the port information corresponding to the source MAC address SA="x" and the destination MAC address DA="y" and the clock in the MAC table TBL1 respectively to the receiving port PR1 and clock t4 (clock at the time of receiving the MAC frame FR7) as with the above operation example (3).

After this, when having received the MAC frames FR8 and FR9 at the receiving port PR1, the reception processor 20 transfers the MAC frames FR8 and FR9 to the latter stage.

In the absence of receiving further MAC frames over a predetermined time after having received the MAC frame FR9 at the receiving port PR1, the reception processor 20 retrieves the MAC table TBL1 over all of the records set with the receiving port PR1 as the port information to be deleted.

Hereafter, when a new MAC frame is received at the receiving port PR1, the MAC table initial registration process described in the above operation example (1) is to be executed.

Also, in parallel with the above operation examples (1)-(4), the reception failure detector 24 shown in FIG. 1 monitors reception failures occurring in the receiving ports PR1 and PR2.

Figure 8A:
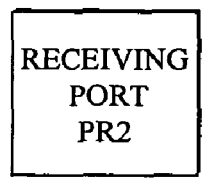
FIGS. 8A and 8B are block diagrams showing an operation of a reception failure detector used in an embodiment [1] of a path changeover method and device.
Figure 8B:
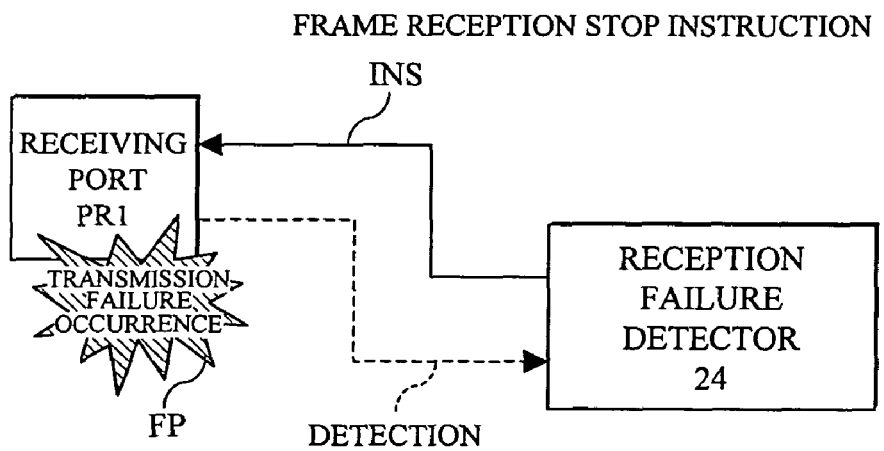

Namely, as shown in FIGS. 8A and 8B, supposing that a reception failure FP occurs at e.g. the receiving port PR1, the reception failure detector 24 having detected this fact gives a frame reception stop instruction INS to the receiving port PR1 to compulsorily stop the reception transfer of the MAC frame FR.

In response, the transmission side switching device 1 is to detect an occurrence of transmission failure to the relay devices 3_1 and 3_2.

It is to be noted that in a case where the transmission side switching device 1 does not make a transmitting port changeback at the transmission failure recovery (namely, a case where the transmitting port changeover is allowed only once under the system demand or the like), the reception processor 20 is not required to perform the determination process with regard to updating process and transmission delay time value $T_D$ of the MAC table TBL1 described in the above operation example (3).

Embodiment [2]: FIGS. 9-13

Figure 9:
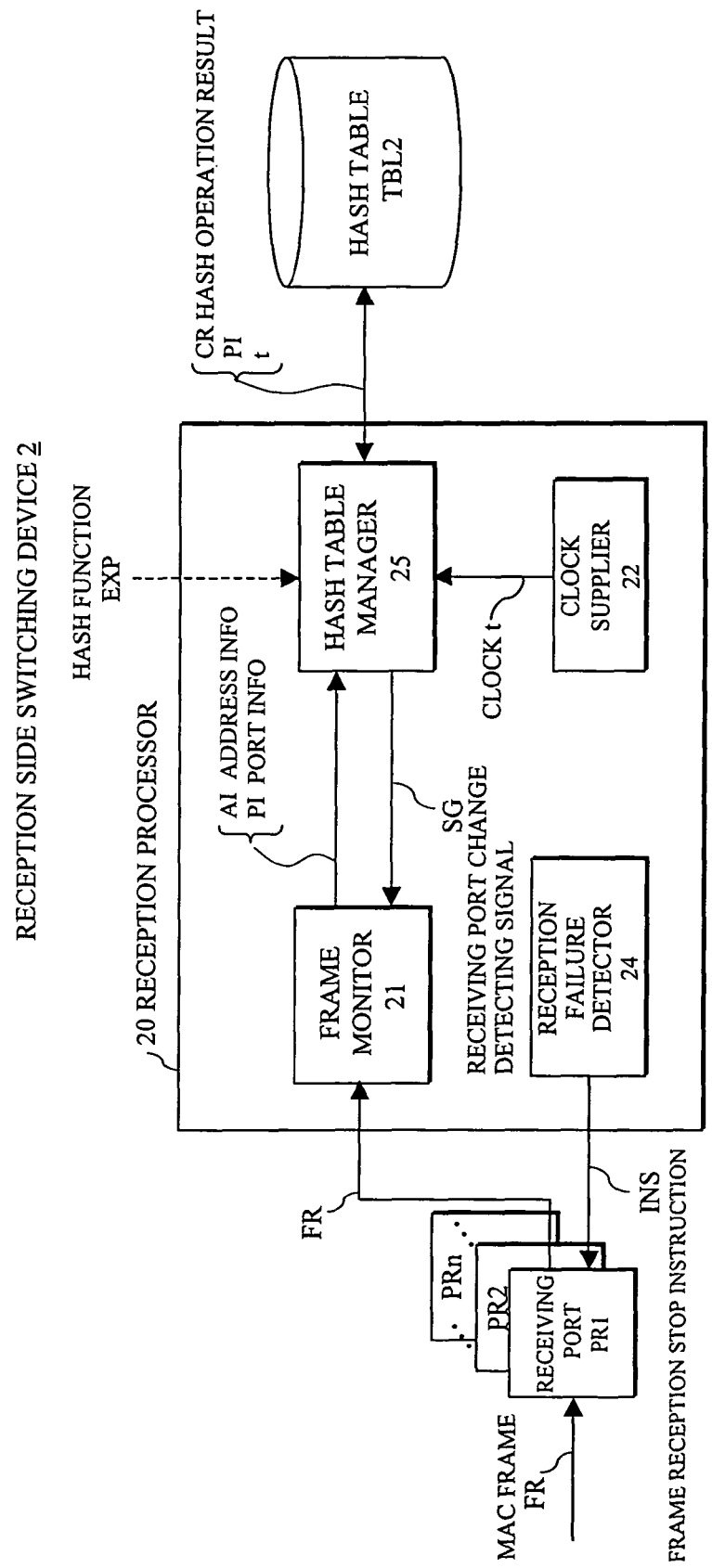
FIG. 9 is a block diagram showing an arrangement of an embodiment [2] of a path changeover method and device.

Arrangement: FIG. 9

The reception side switching device 2 according to an embodiment [2] shown in FIG. 9 is different from the above embodiment [1] in that the MAC table TBL1 and the MAC table manager 23 managing the table shown in FIG. 1 are replaced by a hash table TBL2 and a hash table manager 25 managing the table TBL2.

The hash table manager 25 performs a hashing operation to the address information AI provided by the frame monitor 21 by using the same hashing equation or function EXP as the transmission side switching device 1, registers (updates) the operation result CR, the port information PI and clock t in the hash table TBL2 in association with each other, and detects a receiving port change of the MAC frame by referring to the hash table TBL2.

It is to be noted that while the above hashing equation EXP can be set from a maintenance terminal (not shown), it can be obtained with a control frame (not shown) from the transmission side switching device 1.

Operation Example: FIGS. 10-13

Operations of this embodiment will now be described referring to FIGS. 10-13 in order of (1) operation example in the initial communication state, (2) operation example at a transmission failure occurrence, (3) operation example at a receiving port change detection, and (4) operation example at a transmission failure recovery, as with the above embodiment [1].

It is to be noted that the description of the operation of the reception failure detector 24 is omitted here because it is similar to the above embodiment [1].

Figure 10:
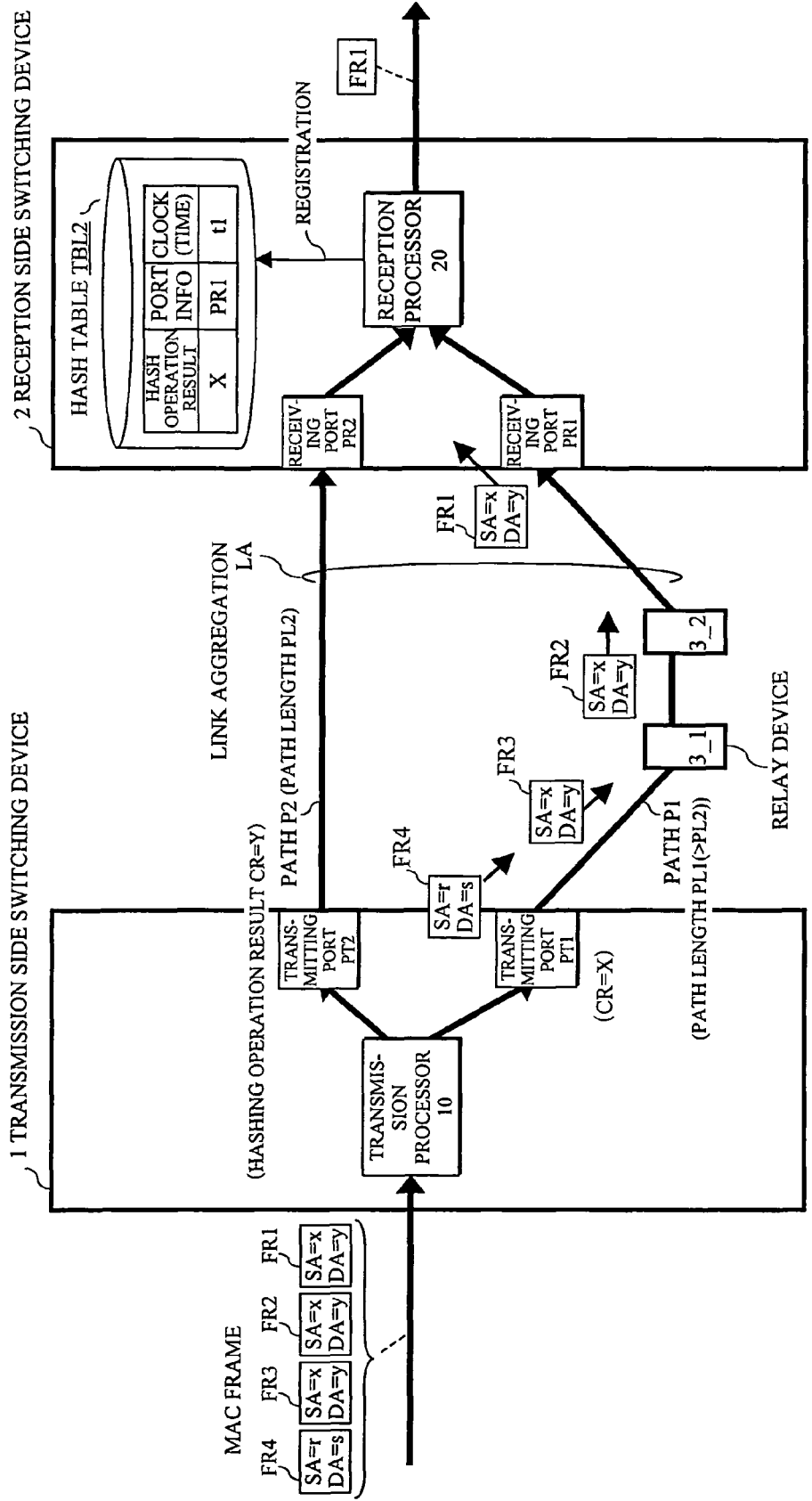
FIG. 10 is a block diagram showing an operation at an initial communication state of an embodiment [2] of a path changeover method and device.

(1) Operation Example in Initial Communication State: FIG. 10

Taking, for example, a case where two physical paths P1, P2 form the link aggregation LA in the L2 network NW as with the above embodiment [1] as shown in FIG. 10, the transmission processor 10 in the transmission side switching device 1 sequentially receives MAC frames FR1-FR3 respectively stored with the same source MAC address SA="x" and the destination MAC address DA="y", as well as a MAC frame FR4 stored with the source MAC address SA="r" and the destination MAC address DA="s".

It is now supposed that the transmission processor 10 transmits the MAC frame FR through the transmitting port PT1 when the hashing operation result CR to the source MAC address SA and the destination address DA is "X", and transmits the MAC frame FR through the transmitting port PT2 when the hashing operation result CR is "Y".

The transmission processor 10 performs a hashing operation with the hashing equation EXP to the source MAC address SA="x" and the destination MAC address DA="y" stored in the MAC frame FR1. If the operation result CR is "X", the transmission processor 10 transmits the MAC frame FR1 through the transmitting port PT1.

Since the MAC frames FR2 and FR3 are stored with the same source MAC address SA="x" and the destination MAC address DA="y" as the MAC frame FR1, the transmission processor 10 acquires the hashing operation result CR="X" and transmits the MAC frames FR2 and FR3 from the transmitting port PT1.

While the MAC frame FR4 is stored with the source MAC address SA="x" and the destination MAC address DA="y" different from the MAC frames FR1-FR3, the transmission processor 10 transmits the MAC frame FR4 from the transmitting port PT1 if the same hashing operation result CR="X" is obtained.

Accordingly, the reception processor 20 in the reception side switching device 2 receives firstly the MAC frame FR1 from the receiving port PR1. At this time, since any record is not yet registered in the hash table TBL2, the reception processor 20 executes an initial registration process to the hash table TBL2.

Namely, the hash table manager 25 shown in FIG. 9 performs a hashing operation to the source MAC address SA="x" and the destination MAC address DA="y" to obtain the hashing operation result CR="X". The hash table manager 25 refers to the hash table TBL2 to determine whether or not there exists a record corresponding to the hashing operation result CR="X". Now supposing that there exists no record corresponding to the hashing operation result CR="X", the hash table manager 25 registers, as shown in FIG. 10, in the hash table TBL2 the hashing operation result CR="X" and the port information PI="receiving port PR1" together with clock t1 supplied from the clock supplier 22.

In this case, the hash table manager 25 does not output the receiving port change detecting signal SG shown in FIG. 9, so that the frame detector 21 transfers the MAC frame FR1 to the latter stage.

Figure 11:
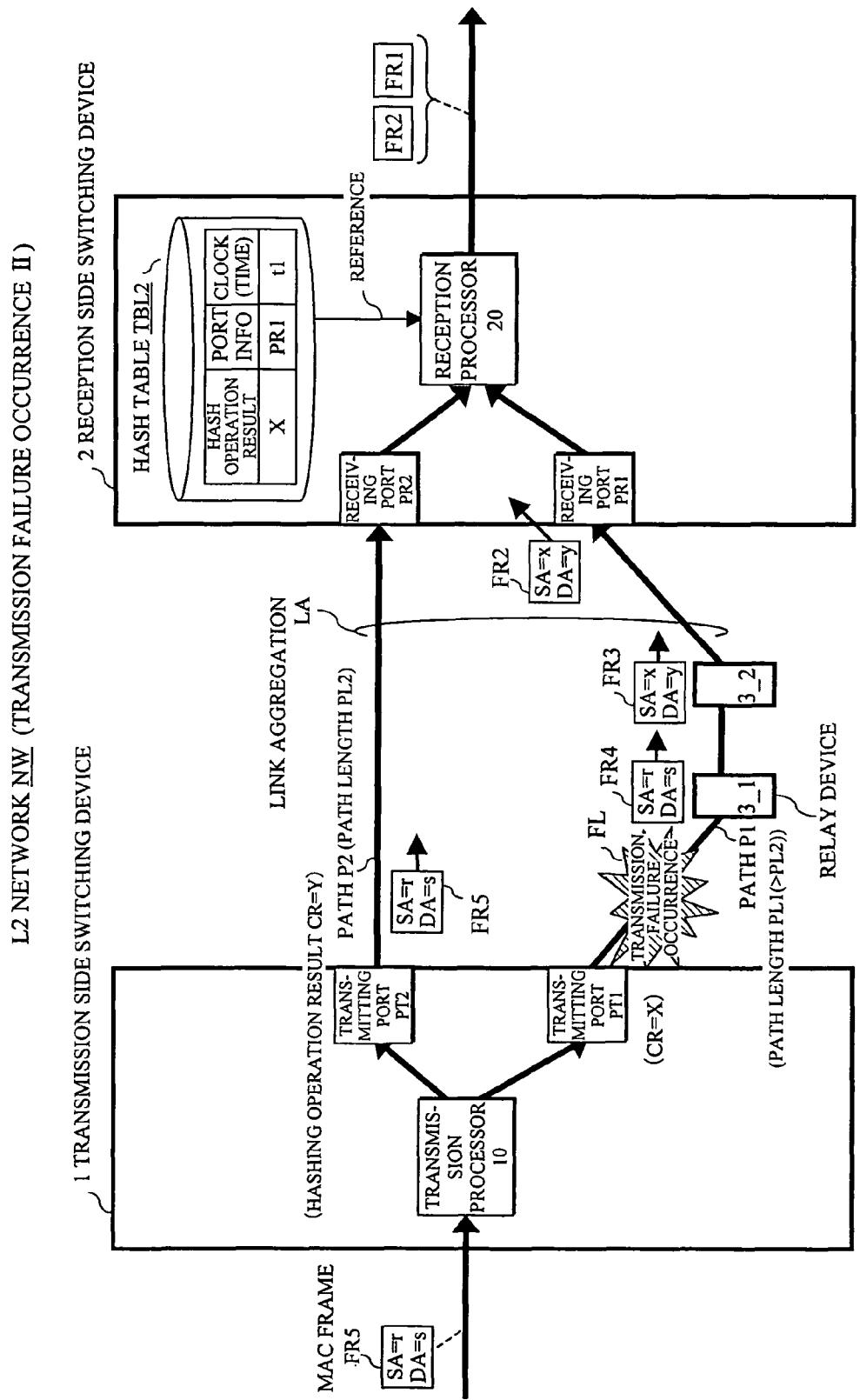
FIG. 11 is a block diagram showing an operation at a transmission failure occurrence of an embodiment [2] of a path changeover method and device.

(2) Operation Example at Transmission Failure Occurrence: FIG. 11

Supposing that as shown in FIG. 11 a transmission failure FL occurs between e.g. the transmitting port PT1 and the relay device 3_1 after the transmission of the MAC frame FR4 shown in FIG. 10, the transmission processor 10 of the transmission side switching device 1 detects the occurrence of the transmission failure FL as with the above embodiment [1] and immediately transmits from the transmitting port PT2 a MAC frame FR5 received subsequent to the MAC frame FR4.

On the other hand, the reception side switching device 2 receives from the receiving port PR1 the MAC frame FR2 transmitted to the path P2 before the transmission failure occurrence. At this time, the reception processor 20 refers to the port information (receiving port PR1) corresponding to the hashing operation result (X) registered in the hash table TBL2 according to the above operation example (1). Since the receiving port PR1 having received the MAC frame FR2 and the port information referred to from the hash table TBL2, the reception processor 20 transfers the MAC frame FR2 to the latter stage.

Figure 12:
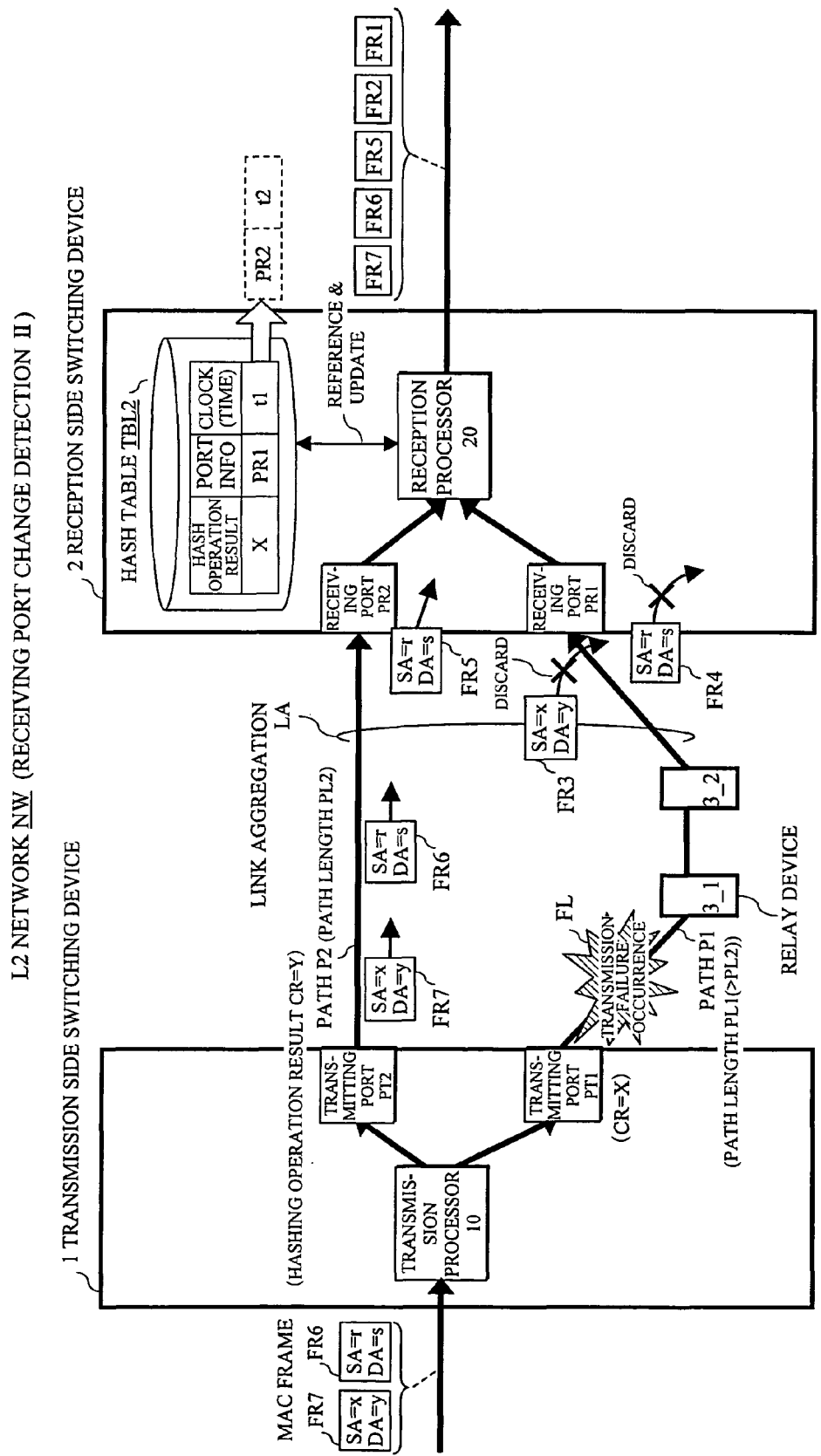
FIG. 12 is a block diagram showing an operation at the time of detecting a receiving port change of an embodiment [2] of a path changeover method and device.

(3) Operation Example at Receiving Port Change Detection: FIG. 12

If the MAC frame FR5 is received at the receiving port PR2 ahead of the MAC frames FR3 and FR4 transmitted to the path P1 since the path length PL1 of the path P1 is longer than the path length PL2 of the path P2 as shown in FIG. 12, the reception processor 20 performs the hashing operation to the source MAC address SA="r" and the destination MAC address DA="s" stored in the MAC frame FR5 to obtain the hashing operation result CR="X".

Then, the reception processor 20 acquires from the hash table TBL2 the port information="receiving port PR1" corresponding to the hashing operation result CR="X". Since the receiving port PR2 having received the MAC frame FR5 is different from the port information="receiving port PR1" acquired from the hash table TBL2, the reception processor 20 detects a change of the receiving port and transfers the MAC frame FR5 to the latter stage.

Thus, the source MAC address SA="r" and the destination MAC address DA="s" stored in the MAC frame FR5 are respectively different from the source MAC address SA="x" and the destination MAC address DA="y" stored in the MAC frame FR1 used in the registration process of the hash table TBL2 shown in the above operation example (1), where the hashing operation result CR is the same "X", so that the reception processor 20 can detect a change of the receiving port.

Hereafter, the reception processor 20 captures the MAC frame received from the receiving port PR2 and discards the MAC frame received from the receiving port PR1 until a change of the receiving port is again detected.

Also, the reception processor 20 updates the port information and the clock corresponding to the hashing operation result="X" in the hash table TBL2 respectively to the receiving port PR2 and clock t2 (clock at the time of having received the MAC frame FR5).

On the other hand, when having received the MAC frames FR3 and FR4 from the receiving port PR1 after the MAC frame FR5, the reception processor 20 performs a hashing operation to the source MAC address SA="x" and the destination MAC address DA="y" to obtain the hashing operation result CR="X".

Then, the reception processor 20 acquires from the hash table TBL2 the port information="receiving port PR2" corresponding to the hashing operation result CR="X". At this time, while the receiving port PR1 having received the MAC frames FR3 and FR4 is different from the port information "receiving port PR2" acquired from the hash table TBL2, the reception processor 20 determines whether or not a lapse of time from the updating time t2 of the hash table TBL2 has exceeded the transmission delay time value $T_D$ of the path P1 with respect to the path P2, as with the above embodiment [1].

Now supposing that the lapse of time does not exceed the transmission delay time value $T_D$, the reception processor 20 determines that the MAC frames FR3 and FR4 are frames remaining in the path P1 at the occurrence of the transmission failure and then discards the MAC frames FR3 and FR4 without detecting a change of the receiving port.

On the other hand, supposing that the lapse of time exceeds the transmission delay time value $T_D$, the reception processor 20 performs an operation at transmission failure recovery described in the undermentioned operation example (4).

After this, when having received the MAC frame FR6 stored with the source MAC address SA="r" and the destination MAC address DA="s" as well as the MAC frame FR7 stored with the source MAC address SA="x" and the destination MAC address DA="y" from the receiving port PR2 (namely, having received the MAC frame holding the hashing operation result CR="X" from the receiving port PR2), the reception processor 20 transfers the MAC frames FR6 and FR7 to the latter stage.

Figure 13:
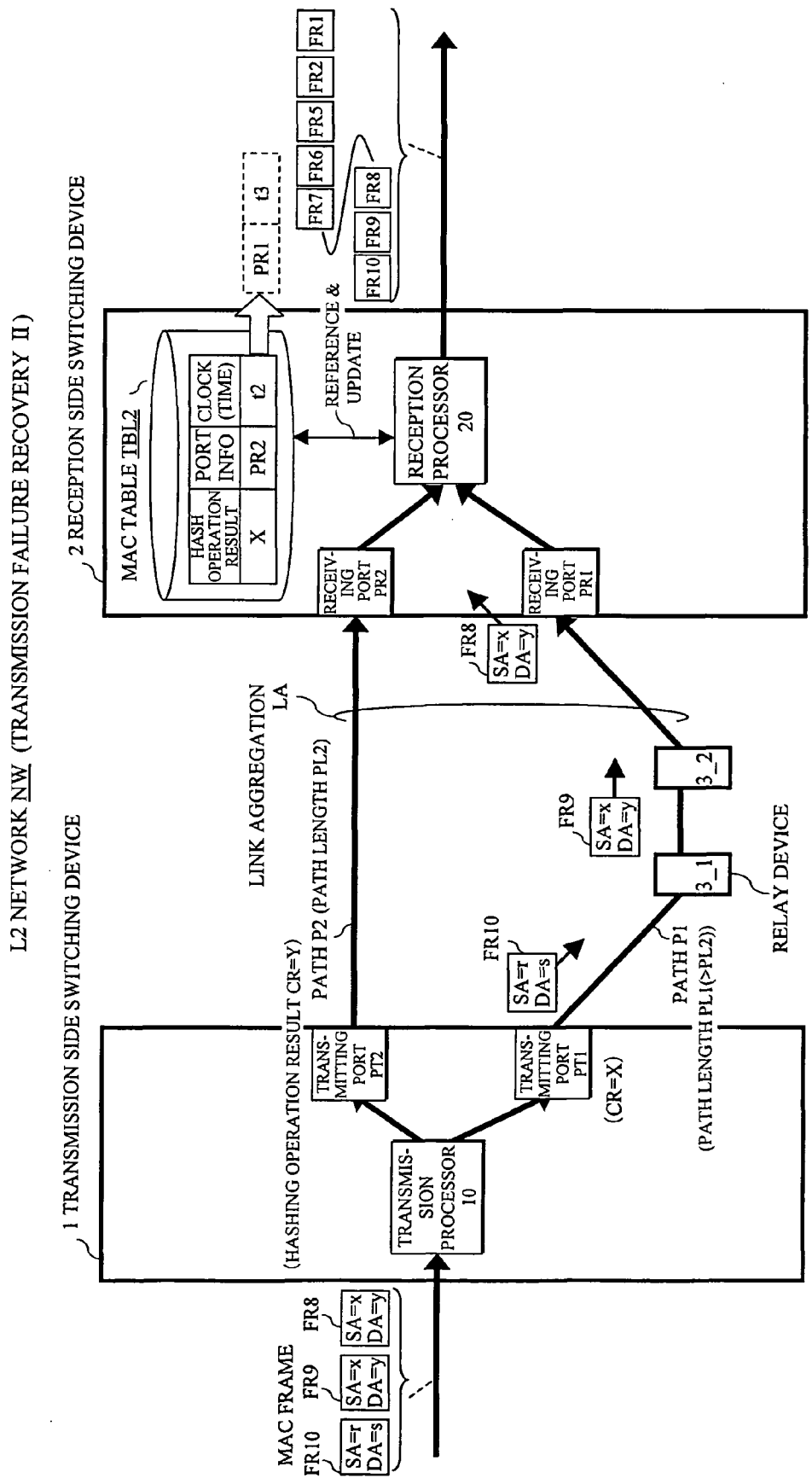
FIG. 13 is a block diagram showing an operation at a transmission failure recovery of an embodiment [2] of a path changeover method and device.

(4) Operation Example at Transmission Failure Recovery: FIG. 13

When the transmission failure FL having been arising between the transmitting port PT1 and the relay device 3_1 is recovered as shown in FIG. 13, the transmission processor 10 in the transmission side switching device 1 transmits from the transmitting port PT1 as with the case before the transmission failure occurrence, following MAC frames FR8 and FR9 stored with the source MAC address SA="x" and the destination MAC address DA="y" as well as a following MAC frame FR10 stored with the source MAC address SA="r" and the destination MAC address DA="s".

When having received the MAC frame FR8 from the receiving port PR1 where it is supposed that the transmission delay time value $T_D$ has lapsed from the updating time t2 of the hash table TBL2 describe in the above operation example (3), the reception processor 20 refers to the hash table TBL2 as with the above operation example (3), thereby finding that the MAC frame FR8 giving the hashing operation result CR="X" is received from the receiving port PR1, not from the receiving port PR2 (namely, a change-back of the transmitting port is made by the transmission side switching device 1) and transferring the MAC frame FR8 to the latter stage. The reception processor 20 updates the port information corresponding to the hashing operation result CR="X" and the clock in the hash table TBL2 respectively to the receiving port PR1 and clock t3 (clock at the time of receiving the MAC frame FR8), as with the above operation example (3).

After this, upon reception of the MAC frames FR9 and FR10 at the receiving port PR1, the reception processor 20 transfers the MAC frames FR9 and FR10 to the latter stage.

In the absence of receiving further MAC frames over a predetermined time interval after having received the MAC frame FR10 at the receiving port PR1, the reception processor 20 retrieves the hash table TBL2 over all of the records set with the receiving port PR1 as the port information to be deleted.

It is to be noted that in case where the transmission side switching device 1 does not make a transmitting port changeback at the transmission failure recovery, the reception processor 20 is not required to make the updating process of the hash table TBL2 and the determination process with regard to the transmission delay time value $T_D$, described in the above operation example (3).

It is to be noted that the present invention is not limited by the above-mentioned embodiments, and it is obvious that various modifications may be made by one skilled in the art based on the recitation of the claims.

For example, it is needless to say that these embodiments can be applied to a network forming a link aggregation with three physical paths or more because a receiving port having received at first a MAC frame stored with the same address information (or address information providing the same hashing operation result) and a receiving port having received the same after the occurrence of the transmission failure have only to be detected.

Figure 16:
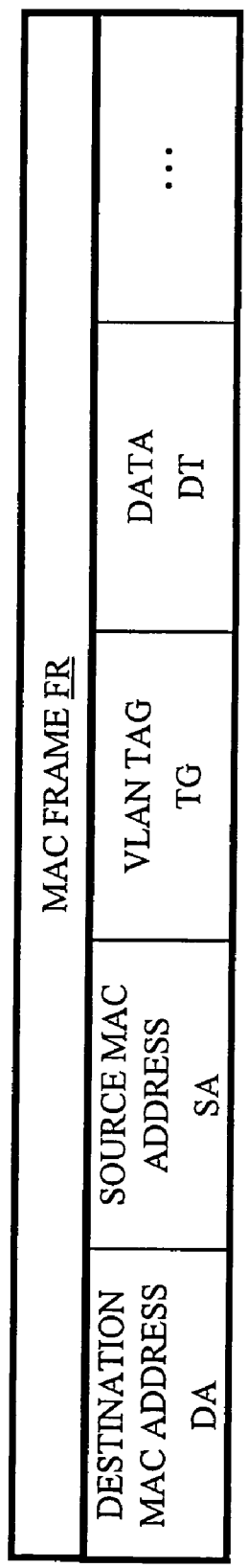
FIG. 16 is a block diagram showing an example of a MAC frame format.

While the above embodiments deal with cases where the source MAC address SA and the destination MAC address DA stored in the MAC frame FR are used as the address information AI, the transmission side switching device 1 can also properly modify them in accordance with the address information used for determining the transmitting port (namely, one of the source MAC address SA and the destination MAC address DA or VLAN tag TG shown in FIG. 16 may be made the address information AI). In this case, the above descriptions are similarly applied.

What is claimed is:

1. A path changeover method comprising:
   storing, at a first physical port, address information of a frame received in association with the first physical port on a reception side;
   capturing, at a second physical port, a frame received when detecting that a frame stored with same address information as the address information stored at said storing is received at the second physical port; and
   discarding following frames received at the first physical port subsequent to said capturing, and wherein the storing includes preparing a table at a reception side associating address information of frames received at physical ports with the physical ports.

2. The path changeover method as claimed in claim 1, wherein the capturing includes retrieving from the table a physical port associated with address information stored in a following frame received at the first physical port after having prepared the table and of detecting, when determining that the retrieved physical port is different from the first physical port having received the following frame, that the following frame stored with the same address information is received at the second physical port, and capturing the following frame received at the second physical port and discarding the following frame received at the first physical port.

3. The path changeover method as claimed in claim 2, wherein the retrieving includes updating the table from the retrieved physical port to the second physical port when detecting that the following frame stored with the same address information is received at the second physical port.

4. The path changeover method as claimed in claim 3, wherein the updating of the table includes recording the updating time of the table in association with the address information; and
  the retrieving of the table includes detecting that a further frame stored with the same address information is received again at the first physical port, when determining that after having updated the table the retrieved physical port is different from the first physical port having received the further frame and a maximum transmission delay time between paths connected to the physical ports has lapsed from the updating time.

5. The path changeover method as claimed in claim 2, wherein the retrieving of the table includes deleting the physical port and the address information associated therewith from the table, when a predetermined time interval has lapsed from a latest time at which the frame is received at the physical port.

6. The path changeover method as claimed in claim 2, wherein the frame is transmitted depending on a hashing operation result with respect to the address information at a source of the frame;
  the preparing of the table includes storing an operation result obtained by performing same hashing operation as the source to the address information in association with the physical port having received the frame; and
  the retrieving of the table includes retrieving from the table a physical port associated with an operation result obtained by performing the hashing operation to the address information stored in a following frame received at the first physical port after having stored the operation result.

7. The path changeover method as claimed in claim 6, wherein the retrieving of the table includes updating the table from the retrieved physical port to the second physical port when detecting that the following frame stored with the same address information is received at the second physical port.

8. The path changeover method as claimed in claim 6, wherein the updating of the table includes recording the updating time of the table in association with the operation result;
  the retrieving of the table includes detecting that a further frame stored with the same address information is received again at the first physical port, when determining that after having updated the table the retrieved physical port is different from the first physical port having received the further frame and a maximum transmission delay time between paths connected to the physical ports has lapsed from the updating time.

9. The path changeover method as claimed in claim 6, wherein the retrieving of the table includes deleting the physical port and the operation result associated therewith from the table, when a predetermined time interval has lapsed from a latest time at which the frame is received at the physical port.

10. The path changeover device as claimed in claim 6, wherein the preparing of the table includes acquiring an equation of the hashing operation from a control frame from the source.

11. The path changeover device as claimed in claim 1, further comprising:
  detecting a reception failure arising at the physical ports and suspending a frame reception at a physical port in which a reception failure is detected.

12. The path changeover method as claimed in claim 1, wherein in case that the frame is a MAC frame, at least one of a source MAC address and destination MAC address, or VLAN tag included in the MAC frame is used for the address information.

13. A path changeover device comprising:
  a first portion of a table storing address information of a frame received at a first physical port in association with the first physical port on a reception side;
  a second portion of a table capturing a frame received at a second physical port when detecting that a frame stored with same address information as the address information stored at the first portion is received at the second physical port, and discarding following frames received at the first physical port, and
  wherein the first portion comprises a third portion preparing a table of the reception side associating address information of frames received at physical ports with the physical ports.

14. The path changeover device as claimed in claim 13, wherein the second portion comprises a fourth portion retrieving from the table a physical port associated with address information stored in a following frame received at the first physical port after having prepared the table and of detecting, when determining that the retrieved physical port is different from the first physical port having received the following frame, that the following frame stored with the same address information is received at the second physical port, and a fifth portion capturing the following frame received at the second physical port and discarding the following frame received at the first physical port.

15. The path changeover device as claimed in claim 14, wherein the fourth portion further comprises a sixth portion updating the table from the retrieved physical port to the second physical port when detecting that the following frame stored with the same address information is received at the second physical port.

16. The path changeover device as claimed in claim 15, wherein the sixth portion further comprises a portion recording the updating time of the table in association with the address information;
  the fourth portion further comprises a portion detecting that a further frame stored with the same address information is received again at the first physical port, when determining that after having updated the table the retrieved physical port is different from the first physical port having received the further frame and a maximum transmission delay time between paths connected to the physical ports has lapsed from the updating time.

17. The path changeover device as claimed in claim 14, wherein the fourth portion further comprises a sixth portion deleting the physical port and the address information associated therewith from the table, when a predetermined time interval has lapsed from a latest time at which the frame is received at the physical port.

18. The path changeover device as claimed in claim 14, wherein the frame is transmitted depending on a hashing operation result with respect to the address information at a source of the frame;
  the third portion comprises a portion storing an operation result obtained by performing same hashing operation as the source to the address information in association with the physical port having received the frame; and
  the fourth portion further comprises a portion retrieving from the table a physical port associated with an operation result obtained by performing the hashing operation to the address information stored in a following frame received at the first physical port after having stored the operation result.

19. The path changeover device as claimed in claim 18, wherein the fourth portion further comprises a sixth portion updating the table from the retrieved physical port to the second physical port when detecting that the following frame stored with the same address information is received at the second physical port.

20. The path changeover device as claimed in claim 18, wherein the sixth portion further comprises a portion recording the updating time of the table in association with the operation result;

the fourth portion further comprises a portion detecting that a further frame stored with the same address information is received again at the first physical port, when determining that after having updated the table the retrieved physical port is different from the first physical port having received the further frame and a maximum transmission delay time between paths connected to the physical ports has lapsed from the updating time.

21. The path changeover device as claimed in claim 18, wherein the fourth portion further comprises a sixth portion deleting the physical port and the operation result associated therewith from the table, when a predetermined time interval has lapsed from a latest time at which the frame is received at the physical port.

22. The path changeover device as claimed in claim 18, wherein the third portion further comprises a portion acquiring an equation of the hashing operation from a control frame from the source.

23. The path changeover device as claimed in claim 13, further comprising a third portion detecting a reception failure arising at the physical ports and suspending a frame reception at a physical port in which a reception failure is detected.

24. The path changeover device as claimed in claim 13, wherein in case that the frame is a MAC frame, at least one of a source MAC address and destination MAC address, or VLAN tag included in the MAC frame is used for the address information.

25. A path changeover method, comprising:

storing address information of a frame received at a first physical port in association with the first physical port on a reception side;

capturing a frame received at a second physical port when detecting that a frame stored with same address information as the address information stored is received at the second physical port, and discarding following frames received at the first physical port, and wherein the storing includes preparing a table associating address information of frames received at physical ports with the physical ports, and the capturing includes retrieving from the table a physical port associated with address information stored in a following frame received at the first physical port after having prepared the table and of detecting, when determining that the retrieved physical port is different from the first physical port having received the following frame, that the following frame stored with the same address information is received at the second physical port, and capturing the following frame received at the second physical port and discarding the following frame received at the first physical port.

* * * * *